INVENTORS
BERTRAM BRINKEBORN
MICHAEL HENZE

United States Patent Office 3,518,859
Patented July 7, 1970

3,518,859
CONTROL EQUIPMENT FOR CONTINUOUS PRODUCTION LINES
Bertram Brinkeborn and Michael Henze, Vasteras, Sweden, assignors to Allmanna Svenska Electriska Aktiebolaget, Vasteras, Sweden, a Swedish corporation
Filed June 5, 1968, Ser. No. 734,584
Claims priority, application Sweden, June 14, 1967, 8,348/67
Int. Cl. B21b *35/04;* B21c *1/12*
U.S. Cl. 72—19         3 Claims

ABSTRACT OF THE DISCLOSURE

In wire drawing benches, continuous rolling mills and other equipment for continuous production lines, several motors are used operating in sequence. Said motors are provided with speed sensing means fed back to a control amplifier for controlling the motors via blocking means transmitting the strongest signal from the different sensing means and blocking the others.

Background of the invention

Figure 1:
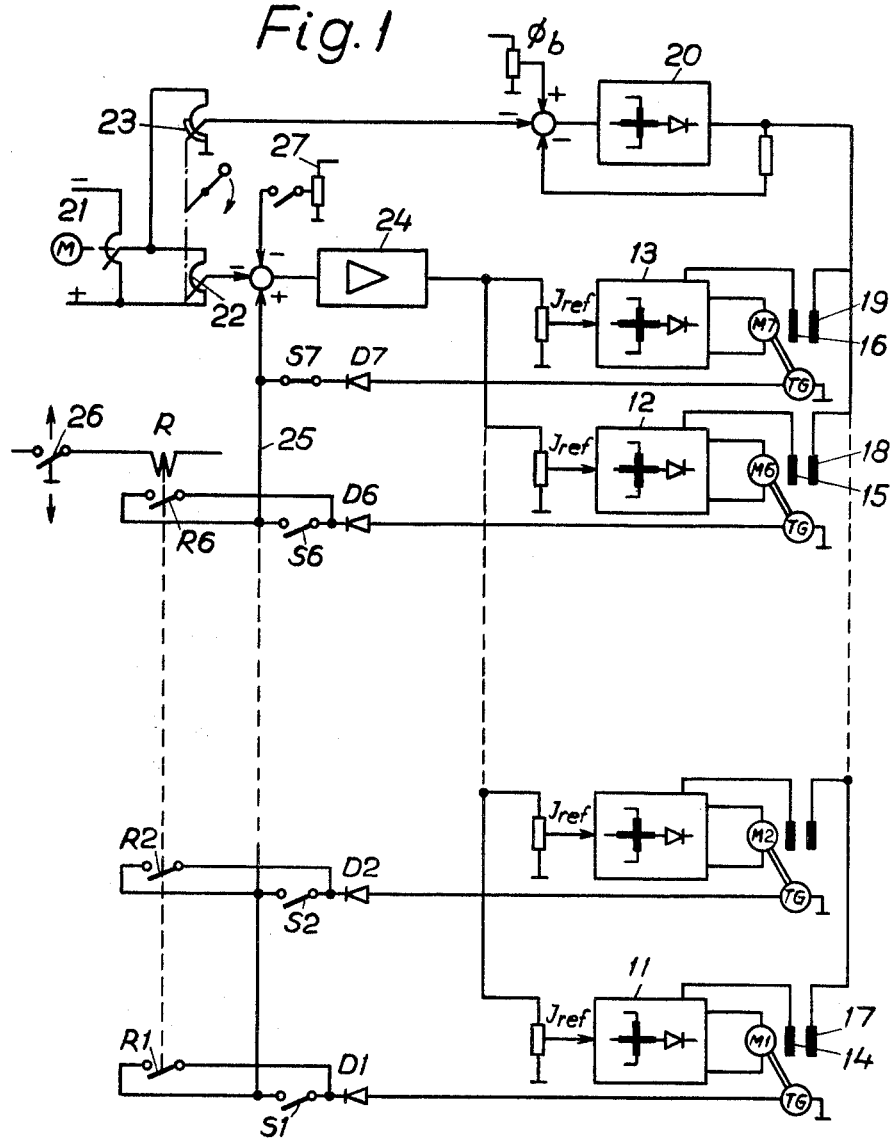

The present invention relates to control equipment for continuous production lines, such as wire drawing benches, continuous rolling mills, etc., which equipment comprises several motors operating in sequence.

Wire drawing benches have been constructed, for instance, with several blocks and driving motors where at least one of the motors is provided with a speed-sensing means, the output signal of which is supplied to a control amplifier (amplifier for the speed signals) for the motors. Each motor is armature fed from a transducer-controlled silicon rectifier. Usually the motor pulling the foremost part of the wire is speed controlled and the speed fault comprises a current reference for all the previous motors in the wire drawing which are thus also current controlled. However, with the help of selectors it is possible to select which motor is to be speed-regulated.

However, with oblique drawing series in wire drawing benches, the first motor (where the wire is thickest) may have to run faster than the last, i.e., the coiling motor. If, therefore, the last motor is speed controlled and a signal is given for full speed, the first motor would have to run at over-speed which is both damaging and impossible since the feeding rectifier cannot be increased to considerably higher voltage. There are also other types of oblique drawing series where one of the intermediate motors runs fastest and there are similar difficulties in this case also (see FIG. 2). Similar problems may also arise with other types of continued production lines, such as continuous hot and cold rolling mills.

Summary of the invention

The invention aims at a solution of these and other similar problems and is characterized in that the motors are provided with speed-sensing means fed back to the input side of a control amplifier via a blocking device designed to select only the strongest speed signal (the signal from the fastest-running motor) for feeding back to the amplifier. In this way, the fastest motor in a wire drawing bench (or production line) will automatically be speed-regulated regardless of its position in the production line and in this way, the abovementioned drawbacks with previously known constructions are avoided. These and other advantages of the invention are clarified in the following.

The drawing

Figure 2:
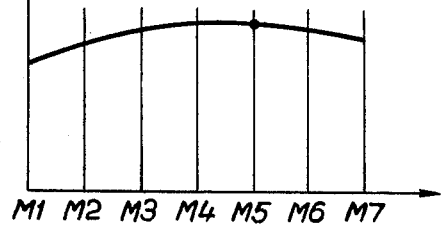

The invention is exemplified in the accompanying drawing, where FIG. 1 shows a connecting diagram for the driving means of a wire drawing bench and FIG. 2 shows an example of the speed relationship for such equipment.

Description of the preferred embodiment

A wire drawing bench consists of a number of drawing blocks, each driven by its own motor M1–M7 (FIG. 1). Each motor is armature fed from an individual transducer-controlled silicon rectifier 11, 12, 13 or from some other controlled current feeding device, known per se.

The motor field consists of a constant field 14, 15, 16 and a variable field 17, 18, 19 fed from a transducer-controlled retifier 20 which is common for all the motors or from some other device equivalent to such a rectifier. The variable field (17–19) is used within the shunt-region of the motors.

The arrangement is equipped with a reference device consisting of a motor-operated potentiometer 21 (M) and a manually operated potentiometer 22, 23, connected after the first potentiometer in order to effect a control and reference signal to a control amplifier 24, which is common for all the motors M1–M7 and to effect a control signal to the field rectifier 20.

Each motor M1–M7 is provided with a speed-sensing member, such as an individual tachometer-generator TG. These are fed back to a common conductor 25 connected to the control amplifier 24 and in each feedback conduit is a diode D1–D7 and also a switch S1–S7. The former is intended to select the highest TG voltage and the latter to disconnect certain speed controls if desired, for example, in connection with drawing in the wire.

Parallel to the switches S1–S6 are short-circuiting circuits for these which are closed in normal operation via relay contacts R1–R6. The relay coil, common for the contacts R1–R6, is shown at R and during normal operation, the relay is energized (connecting member 26 in the upper position). The contacts R1–R6 should be open while the wire is being inserted (connecting member 26 in the lower position). Short-circuiting circuits of this type are omitted in the circuits for the motor M7. A reference for creep running may be connected at 27. The diodes D1–D7 may be replaced by other blocking members such as relays, transistor circuits, etc.

Wire is inserted in a wire drawing bench in the following manner:

The selector 26 is set in the lower position and the switches S1–S6 are opened. The potentiometer 21 is set at 100% output signal and the potentiometers 22 and 23 at 0%. S1 is closed. The potentiometers are then reset to 10–20% so that the current from the silicon rectifier 20 remains at a value corresponding to the larger reference signal $\phi b$, and the fields 17–19, together with 14–16, provide the motors with base flux.

The motor M1 is speed controlled at S1 and the output signal from the control amplifier 24 is dependent on the speed error comprising the current reference for the motor. M1 is run at low speed until a number of turns of the wire have been wound up on the corresponding block. The wire is then attached to the next block, S1 opens and S2 closes, whereby the corresponding motor M2 becomes a speed-controlled and M1 becomes current-controlled. In the last stage of the insertion, M7 is speed-controlled (S7 is closed) and the other motors M1–M6 are only current-regulated (S1–S6 open).

After completed insertion, the selector 26 is set in its upper position, whereby the contacts R1–R6 are closed, S7 is closed. After this, the potentiometers 22–23 are successively set at a higher value. Up to a certain speed $n_{base}$ the fields 17–19 are proportional to $\varphi b$, and the reference signal from the potentiometer 23 then decrease the field signal so that the speed increases from $n_{base}$ to $n_{sh}$ and the EMF for the motors M1–M2 remains constant up to $n_{sh}$ (full shunt value). Since the process demands substantially constant torque, the armature current will increase for the motor which is speed-controlled, but since all current references are parallel, a corresponding increase is also obtained automatically for the other motors.

The greatest speed signal passes its diode and continues as a speed error signal to the amplifier 24. If no diodes were present in the other feedback circuits, the difference signal between said speed signal and the prevailing signal for the other motors would return to the respective TG, but said difference signal is blocked by the respective diodes and therefore, only the strongest speed signal, i.e., corresponding to the fastest running motor, is received by the amplifier.

FIG. 2 shows the speeds (n) at oblique drawing, and it is seen here that the motor M5 is running fastest. By using the device described, the control amplifier 24 will be fed with the speed error for the motor M5 and M5 will therefore be speed-controlled and the other motors current-controlled. If one of the other motors should suddenly run fastest, this will automatically be speed-controlled and the motor M5 and the other motors will then be current-controlled.

The following advantages are obtained with the selector connection according to FIG. 1:

(1) The wire drawing bench (rolling mill, etc.) cannot be run faster than the maximum speed for any one of the motors.

(2) The motors cannot be subjected to over-voltage.

(3) The motors are utilized to the best possible effect.

(4) Breakages in the wire or tape are prevented since no motor can be driven up to such high speed that the feeding rectifier (11–13) reaches maximum output voltage.

(5) A check on wire breakage is obtained automatically. If the wire breaks somewhere, for example at a current-controlled motor, the speed of this motor increases rapidly since its load disappears. Since the speed therefore increases more than the speed-controlled motor in the series, the racing motor changes over to being speed-controlled and emits a current reference to all the other motors. Since this motor is unloaded, however, the current reference signal will be very small and all the motors stop. The previously used checks for wire breakage are expensive and complicated and can now be eliminated.

The invention according to the above can be varied in many ways within the scope of the following claims.

What is claimed is:

1. Control equipment for continuous production lines, such as wire drawing benches, continuous rolling mills, etc., said equipment comprising several motors operating in sequence and a control amplifier for controlling the motors, said motors being provided with speed-sensing means fed back to the input side of the control amplifier via blocking means, said blocking means blocking other signals than the strongest speed signal from the sensing means.

2. Control equipment as claimed in claim 1, in which said blocking means consists of diodes connected in the feedback circuits.

3. Control equipment as claimed in claim 1, in which said feedback circuits are connected switches for connection and disconnection, respectively, of the speed controls for the various motors.

References Cited

UNITED STATES PATENTS 3,314,264    4/1967    Vater et al.            72—443
3,363,441    1/1968    Smith                72—8

LOWELL A. LARSON, Primary Examiner

U.S. Cl. X.R.

72—249, 442, 443